(12) United States Patent
Werner et al.

(10) Patent No.: US 7,475,208 B2
(45) Date of Patent: *Jan. 6, 2009

(54) METHOD FOR CONSISTENT COPYING OF STORAGE VOLUMES

(75) Inventors: Sam Clark Werner, Tucson, AZ (US); William Frank Micka, Tucson, AZ (US); Sivan Tai, Yokneam Illit (IL); Ifat Nuriel, Haifa (IL); Sheli Rahav, Haifa (IL); Gail Andrea Spear, Tucson, AZ (US); Warren K. Stanley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 11/534,136

(22) Filed: Sep. 21, 2006

(65) Prior Publication Data

US 2007/0022267 A1    Jan. 25, 2007

Related U.S. Application Data

(63) Continuation of application No. 10/464,937, filed on Jun. 18, 2003, now Pat. No. 7,133,982.

(51) Int. Cl.
*G06F 12/16* (2006.01)
(52) U.S. Cl. .................................. 711/162; 711/165
(58) Field of Classification Search .............. 711/162, 711/165, 114, 112, 161; 707/203, 202, 201
See application file for complete search history.

(56) References Cited

U.S. PATENT DOCUMENTS

| 7,185,222 | B2 * | 2/2007 | Burton et al. .................. 714/5 |
| 7,240,080 | B2 * | 7/2007 | Micka et al. ................ 707/204 |
| 7,330,948 | B2 * | 2/2008 | Deguchi et al. ............. 711/162 |
| 2005/0071372 | A1 * | 3/2005 | Bartfai et al. ............ 707/104.1 |
| 2007/0185928 | A1 * | 8/2007 | Davis et al. ................ 707/203 |

FOREIGN PATENT DOCUMENTS

EP    1 785 869 A1 *   5/2007

OTHER PUBLICATIONS

ACOS software, "User's Guide for ACOS-4/NPX Symmetrix Operation Function", first edition, NEC Co., Ltd., pp. 1-60, Apr. 30, 2004.
IBM Corp., "IBM TotalStorage SAN Volume Controller Storage Software for Cisco MDS 9000: Designed to Reduce Total Cost of Ownership and Complexity of Managing Storage", Software Announcement Oct. 14, 2003, pp. 1-16.
Information Materials for IDS document dated Dec. 11, 2007 re JPO Office Action dated Dec. 4, 2007.

* cited by examiner

*Primary Examiner*—Pierre-Michel Bataille
(74) *Attorney, Agent, or Firm*—Rabindranath Dutta; Konrad Raynes & Victor LLP

(57) ABSTRACT

Provided is a method for copying storage. Copy operations are performed on source storage units to copy to target storage units, wherein the copy operations create a consistent copy of the source storage units in the target storage units. While performing a copy operation to copy from one source storage unit to one target storage unit, a write operation is restricted from being performed on the one source storage unit, until the copy operations have been performed on the source storage units.

6 Claims, 7 Drawing Sheets

METHOD FOR CONSISTENT COPYING OF STORAGE VOLUMES

CROSS-REFERENCE TO RELATED APPLICATIONS

This application is a continuation of application Ser. No. 10/464,937 filed on Jun. 18, 2003, which is incorporated herein by reference in its entirety.

BACKGROUND OF THE INVENTION

1. Field of the Invention

The present invention relates to a method, system, and an article of manufacture for consistent copying of storage volumes.

2. Description of the Related Art

Information technology systems, including storage systems, may need protection from site disasters or outages, where outages may be planned or unplanned. Furthermore, information technology systems may require features for data migration, data backup, or data duplication. Implementations for disaster or outage recovery, data migration, data backup, and data duplication may include mirroring or copying of data in storage systems. Such mirroring or copying of data may involve interactions among servers, clients, storage systems and networking components of the information technology system.

Enterprise storage servers (ESS), such as, the IBM* TotalStorage Enterprise Storage Server*, maybe a disk storage server that includes one or more processors coupled to storage devices, including high capacity scalable storage devices, Redundant Array of Independent Disks (RAID), etc. The enterprise storage servers are connected to a network and include features for copying data in storage systems.

*IBM, IBM TotalStorage Enterprise Storage Server, Enterprise System Connection (ESCON) are trademarks of International Business Machines Corp.

Enterprise storage servers (ESS) may include copy functions for copying data either locally, i.e., within the same on-site ESS, or remotely, i.e., copying data to a separate remote-site ESS. The copy functions can be classified as either dynamic or point-in-time copy functions. Dynamic copy functions constantly update the secondary copy as applications make changes to the primary data source. Point-in-time copying techniques provide an instantaneous copy or view of what the original data looked like at a specific point in time.

In certain enterprise storage servers there may be copy functions, such as, Flashcopy, that provide a point-in-time copy of the data. Implementations may copy data between a set of local/source volumes and a corresponding set of remote/target volumes in enterprise storage servers. Flashcopy may provide a point-in-time copy for ESS volumes by creating a physical point-in-time copy of the data, with minimal interruption to applications, and make it possible to access both the source and target copies substantially immediately. Both the source and the target volumes reside on the same ESS system, although implementations may be possible where the source and target volumes reside on different ESS systems. Further details of the Flashcopy are described in the IBM publication "IBM TotalStorage Enterprise Storage Server: Implementing ESS Copy Services with IBM eServer zSeries," IBM document no. SG24-5680-01 (Copyright IBM, 2003), which publication is incorporated herein by reference in its entirety.

SUMMARY OF THE PREFERRED EMBODIMENTS

Provided are a method, system, and article of manufacture for copying storage. Copy operations are performed on source storage units to copy to target storage units, wherein the copy operations create a consistent copy of the source storage units in the target storage units. While performing a copy operation to copy from one source storage unit to one target storage unit, a write operation is restricted from being performed on the one source storage unit, until the copy operations have been performed on the source storage units.

In further implementations, a first write operation is received for a first storage unit. A determination is made if the first storage unit is in a state where write operations are restricted. If the first storage unit is in a state where write operations are restricted, then the first write operation is queued. If the first storage unit is in a state where write operations are not restricted, then the first write operation is performed on the first storage unit.

Provided also are a method, system, and article of manufacture, where a copy command is received to copy from a source storage unit to a target storage unit. Copying is started from the source storage unit. A state is entered into at the source storage unit in response to starting to copy from the source storage unit, wherein no write operation can be completed to the source storage unit in the state. The state is released at the source storage unit in response to an additional command received at the source storage unit, wherein the additional command indicates the release of the state, and wherein data in the source and target storage units are in a consistent state in response to the release of the state at the source storage unit.

In further implementations, the source storage unit is coupled to a storage control unit, wherein the copy command is received from a host coupled to the storage control unit, and wherein the source storage unit is a logical unit addressed via a logical storage subsystem coupled to the storage control unit.

The implementations copy a set of source volumes to a set of target volumes, while maintaining the data on the set of source volumes and target volumes in a consistent state at a point in time with respect to each other. Maintaining source and target volumes in a consistent state ensures that no out of order dependent writes are copied to any target volumes in a consistency group.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Inconsistent Data in Volumes after Flashcopy Operations

A flashcopy consistency group is a group of storage volumes that need to be kept in a consistent state with each other. To provide a non-limiting example, a first flashcopy command copies volume A1 to B1 and a second flashcopy command copies volume A2 to B2. It is required that volumes B1 and B2 should represent a consistent state of the dataset in volumes A1 and A2 at a certain point in time. In a certain sequence of operations on the volumes the following set of dependent write operations may occur (where the second operation occurs after the first operation):
1. Write to dataset on volume A1 (data updated)
2. Write to dataset on volume A2 (data updated)

When volumes A1 and A2 are flashcopied to volumes B1 and B2 respectively, then the following non-limiting example of a sequence of operations may create an inconsistent state in volumes B1, B2 with respect to volumes A1, A2.
1. Flashcopy volume A1 to volume B1
2. Write to dataset on volume A1 (data updated)
3. Write to dataset on volume A2 (data updated)
4. Flashcopy volume A2 to volume B2

At the conclusion of all the flashcopy operations, i.e., the conclusion of the fourth operation, volume B2 contains the data update of volume A2 whereas volume B1 does not contain the data update of volume A1. The set of volumes B1, B2 are in an inconsistent state with respect to the set of volumes A1, A2. An application that uses the volumes B1, B2 could not recover from a back-up copy stored in the volumes B1, B2.

Maintaining Consistent Data during and after Flashcopy Operations

Figure 1:
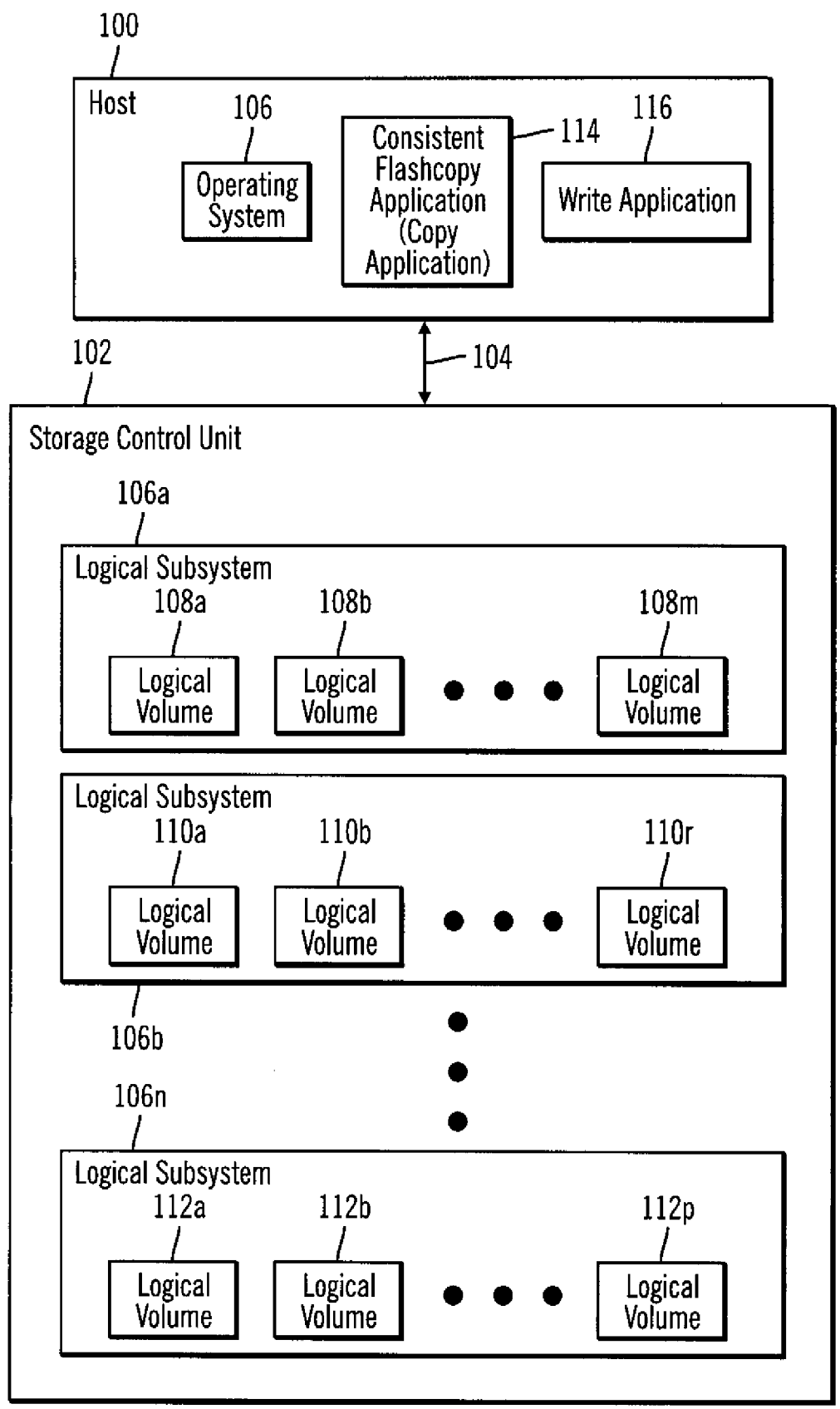
FIG. 1 illustrates a block diagram of a computing environment, in accordance with certain described aspects of the invention.

FIG. 1 illustrates a computing environment utilizing a host 100 coupled to a storage control unit 102. While only a single host 100 is shown coupled to a single storage control unit 102, in certain alternative implementations of the invention a plurality of hosts may be coupled to a plurality of storage control units. The host 100 may connect to the storage control unit 102 through a host data interface 104 channel, such as the Enterprise System Connection (ESCON)* channel or any other switching mechanism known in the art (e.g., fibre channel, Storage Area Network (SAN) interconnections, etc.).

The host 100 maybe any computational device known in the art, such as a personal computer, a workstation, a server, a mainframe, a hand held computer, a palm top computer, a telephony device, network appliance, etc. The host 100 may include any operating system 106 known in the art, such as the IBM OS/390** operating system.

The storage control unit 102 includes a plurality of logical subsystems 106a . . . 106n, where a logical subsystem 106a . . . 106n may include a plurality of logical volumes. For example, logical subsystem 106a includes logical volumes 108a . . . 108m, logical subsystem 106b includes logical volumes 110a . . . 110r, and logical subsystem 106n includes logical volumes 112a . . . 112p.

The storage control unit 102 controls a plurality of physical storage devices (not shown), each of which may include one or more physical volumes (not shown). The physical storage devices may include any physical storage devices known in the art, such as, Direct Access Storage Devices (DASD), Just a Bunch of Disks (JBOD), Redundant Array of Inexpensive Disks (RAID), etc.

The storage control unit 102 maps the physical volumes into the plurality of logical volumes, such as, logical volumes 108a . . . 108m, 110a . . . 110r, 112a . . . 112p that are distributed among the logical subsystems 106a . . . 106n. The host 100 may address the logical subsystems 106a . . . 106n and perform operations, such as, read, write, copy, etc., with respect to a logical volume.

In addition to the operating system 106, the host 100 many include a consistent flashcopy application 114 and a write application 116. The consistent flashcopy application 114 copies a first set of logical volumes distributed among the logical subsystems 106a . . . 106n to a second set of logical volumes distributed among the logical subsystems 106a . . . 106n. For example, the consistent flashcopy application 114 may copy an exemplary first set of logical volumes 108a, 108b, 110a to an exemplary second set of logical volumes 112a, 112b, 112p. The consistent flashcopy application 114 copies a logical volume via a flashcopy operation. The consistent flashcopy application 114 may be referred to as a copy application when a storage volume is copied using any point-in-time copying technique known in the art. The write application 116 may generate write requests on logical volumes via the logical subsystems 106a . . . 106n of the storage control unit 102.

Therefore, FIG. 1, illustrates a computing environment for copying a first set of logical volumes to a second set of logical volumes. In alternative implementations of the invention, the first set of logical volumes and the second set of logical volumes may be distributed among a plurality storage control units.

Figure 2:
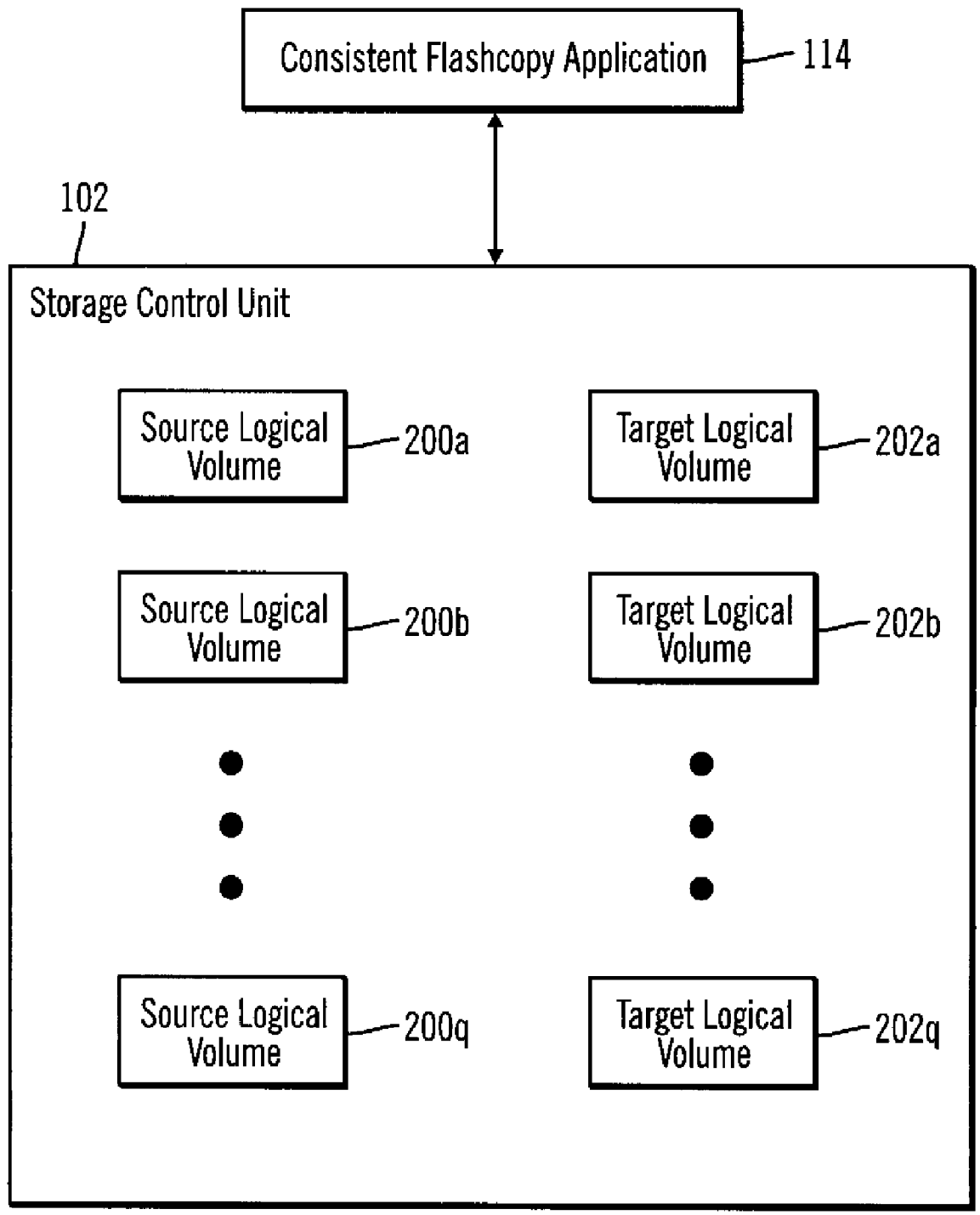
FIG. 2 illustrates a block diagram of source and target logical volumes in a storage control unit, in accordance with certain described implementations of the invention.

FIG. 2 illustrates a block diagram of source and target logical volumes in the storage control unit 102, in accordance with certain implementations of the invention. The consistent flashcopy application 114 copies a set of source logical volumes 200a . . . 200q to a set of target logical volumes 202a . . . 202q, where the source and target logical volumes are resident in the storage control unit 102. For example, the consistent flashcopy application 114 may copy the source logical volume 200a to the target logical volume 202a, the source logical volume 200b to the target logical volume 202b, and the source logical volume 200q to the target logical volume 202q. The source logical volumes 200a . . . 200q may be distributed among the logical subsystems 106a . . . 106n. Similarly, the target logical volumes 202a . . . 202q may be distributed among the logical subsystems 106a . . . 106n. In alternative implementations of the invention the source logical volumes 200a . . . 200q and the target logical volumes 202a . . . 202q may span multiple storage control units.

Therefore, FIG. 2 illustrates how the consistent flashcopy application 114 copies a first set of logical volumes 200a . . . 200q to a second set of logical volumes 202a . . . 202q in the storage control unit 102.

Figure 3:
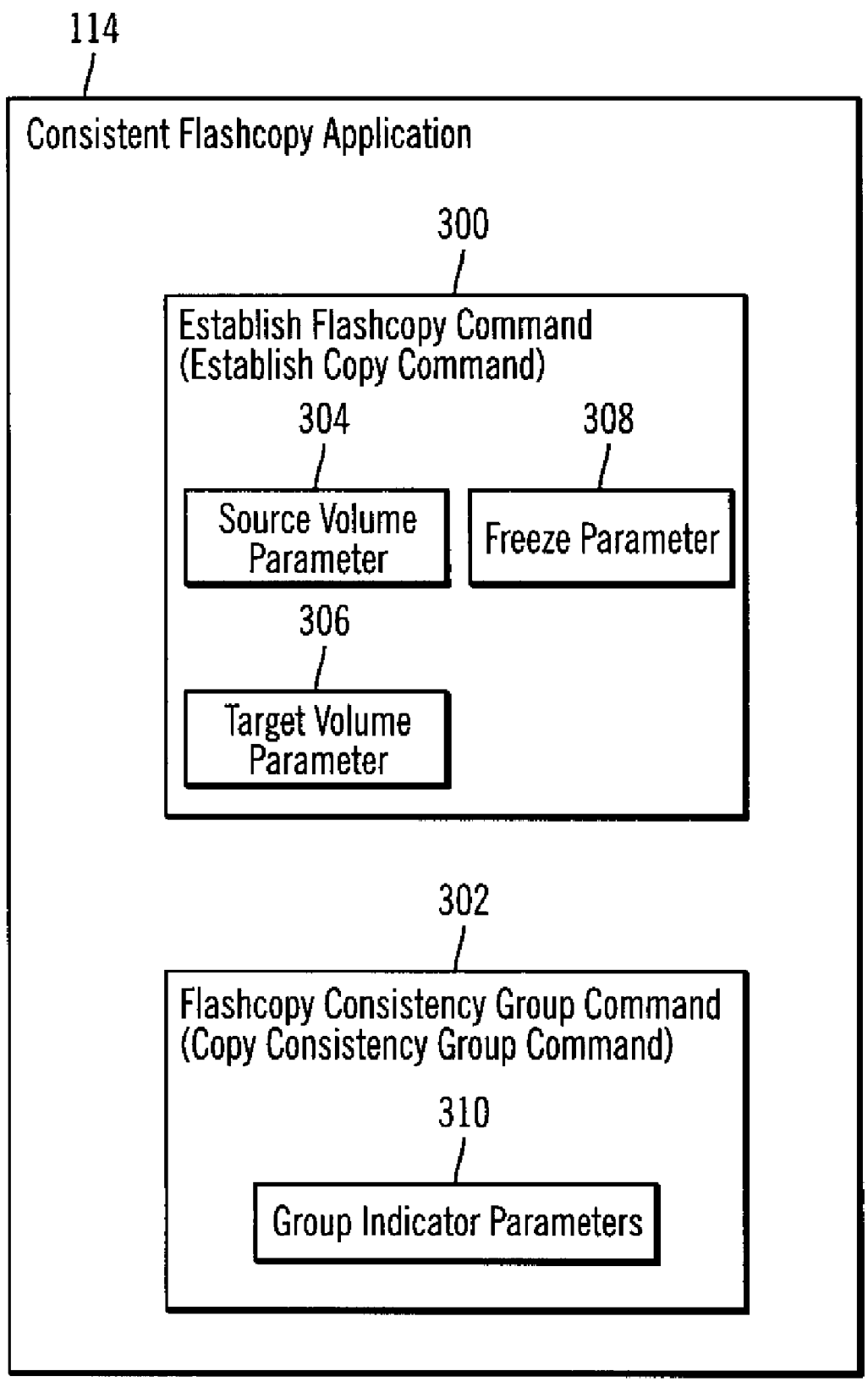
FIG. 3 illustrates a block diagram of a consistent flashcopy application, in accordance with certain described implementations of the invention.

FIG. 3 illustrates a block diagram of the consistent flashcopy application 114, in accordance with certain implementations of the invention. The consistent flashcopy application 114 may generate an "Establish flashcopy" command 300 and a "Flashcopy consistency group" command. The "Establish flashcopy" command 300 may be referred to as an "Establish copy" command 300 and the "Flashcopy consistency group" command 302 may be referred to as a "Copy consistency group" command because the implementations of the invention may apply any point-in-time copying techniques known in the art, including flashcopy techniques.

The "Establish flashcopy" command 300 includes a source volume parameter 304, a target volume parameter 306, and a freeze parameter 308. The source volume parameter 304 may include a source logical volume, such as, source logical volume 200a . . . 200q. The target volume parameter 206 may include a target logical volume, such as, target logical volume 202a . . . 202q. The "Establish flashcopy" command 300 flashcopies the source volume indicated in the source volume parameter 304 to the target volume indicated in the target volume parameter 306.

The freeze parameter 308 maybe either true or false. If the freeze parameter 308 is true then the "Establish flashcopy" command 300 causes the source volume indicated in the source volume parameter 304 to stay in an extended long busy state after the "Establish flashcopy" command completes, until the appropriate "Flashcopy consistency group" command 302 has been executed. When a volume, such as, the source volume indicated in the source volume parameter 304, is in a long busy state, the source volume may not be written to by any application, such as the write application 116.

The "Flashcopy consistency group" command 302 may include group indicator parameters 310, where the group indicator parameters 310 indicate a set of volumes whose long busy state should be reset when the "Flashcopy consistency group" command 302 is executed. In certain implementations, the group indicator parameters 310 may indicate the volumes whose long busy state should be reset (i.e., the volume that may be written to) by addressing the appropriate logical subsystems 106a . . . 106n that include the volumes whose busy state should be reset. In alternative implementations, the group indicator parameters 310 may indicate a set of sessions whose long busy state should be reset.

For example, the "Establish flashcopy" command 300 may have placed source logical volumes 200a, 200b in a long busy state. When a "Flashcopy consistency group" command 302 is executed then the group indicator parameters 310 may indicate that logical volumes 200a, 200b should be reset from the long busy state. If logical subsystem 106a includes the logical volume 200a, and if logical subsystem 106b includes the logical volume 200b, then the "Flashcopy consistency group" command may request the logical subsystems 106a and 106b to reset the logical volumes 200a, 200b from the long busy state.

Therefore, FIG. 3 illustrates how the consistent flashcopy application 114 sets certain source volumes to a long busy state for an extended period of time after performing the "Establish flashcopy" command 300. The "Flashcopy consistency group" command 302 resets the long busy state of the volumes indicated in the group indicator parameters 310 of the "Flashcopy consistency group" command 302.

Figure 4:
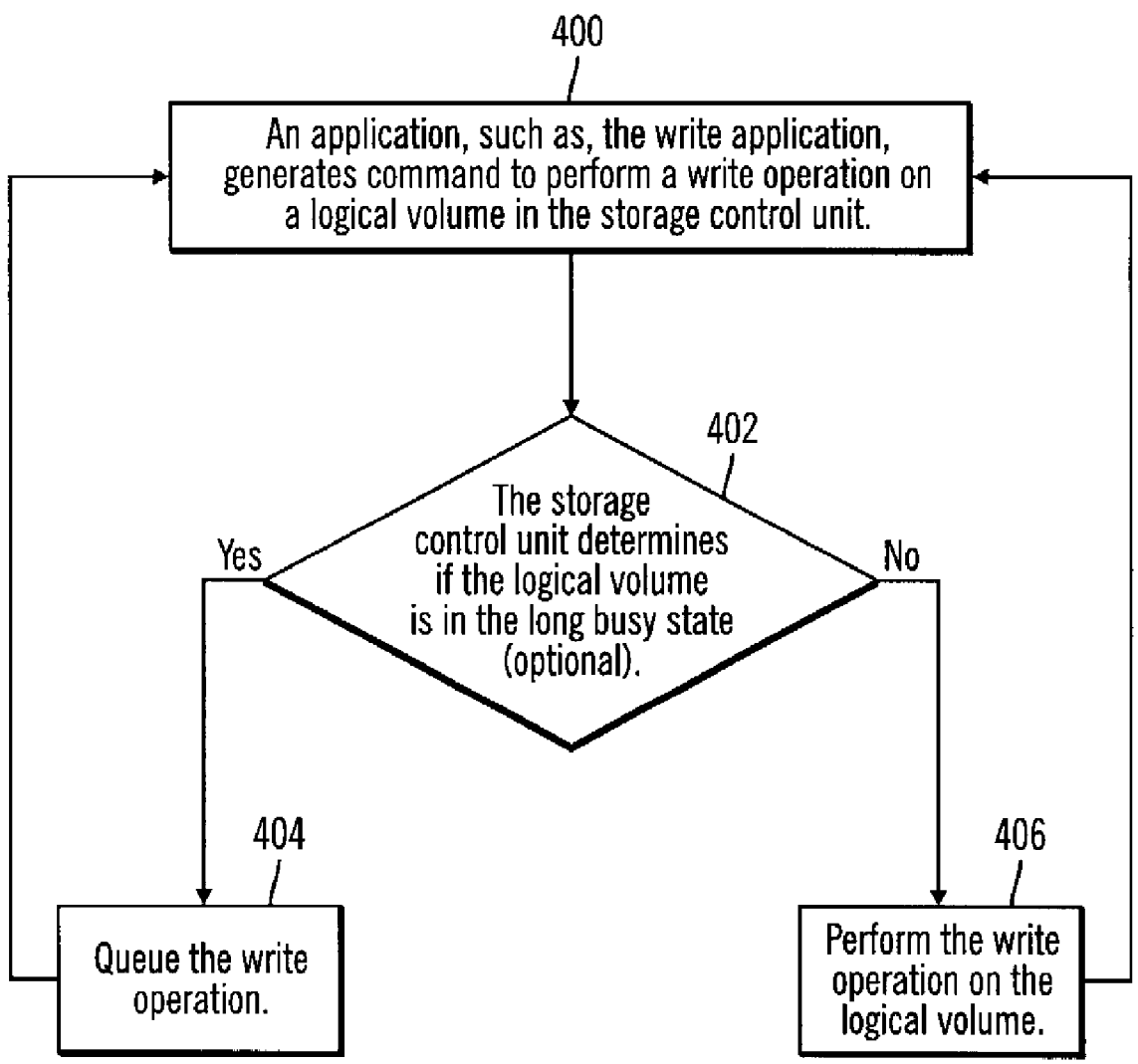
FIG. 4 illustrates logic for writing on logical volumes, in accordance with certain described implementations of the invention.

FIG. 4 illustrates logic for writing on logical volumes in the storage control unit 102, in accordance with certain implementations of the invention. The logic of FIG. 4 may be executed in the storage control unit 102 after the storage control unit 102 has received a write operation generated by the write application 116 on the host 100.

Control starts at block 400, where an application, such as, the write application 116, in the host 100 generates a command to perform a write operation on a logical volume in the storage control unit 102. The storage control unit 102 receives the write operation and before writing, the storage control unit 102 determines (at block 402) if the logical volume is in the long busy state. If so, the storage control unit 102 or the write application 116 queues (at block 404) the write operation for writing later on, because the logical volume cannot be written to while the logical volume is in the long busy state. The storage control unit 102 returns control to the decision block 402 and the process may keep on repeating the loop formed by decision block 402 and block 404.

If the storage control unit 102 determines (at block 402) that the logical volume is not in the long busy state, then the storage control unit 102 performs (at block 406) the write operation on the logical volume and control returns to block 400.

Therefore, the logic of FIG. 4 illustrates how the write application 116 writes data on a logical volume when the logical volume is in not in a long busy state. In certain alternative implementations, the write operation may be queued (at block 404) without performing the logic of block 402, i.e., without determining if the logical volume is in the long busy state. In such alternative implementations, the storage control unit 102 or the write application 116 may queue all write operations but only perform the write operations on the logical volumes that are not in the long busy state.

Figure 5:
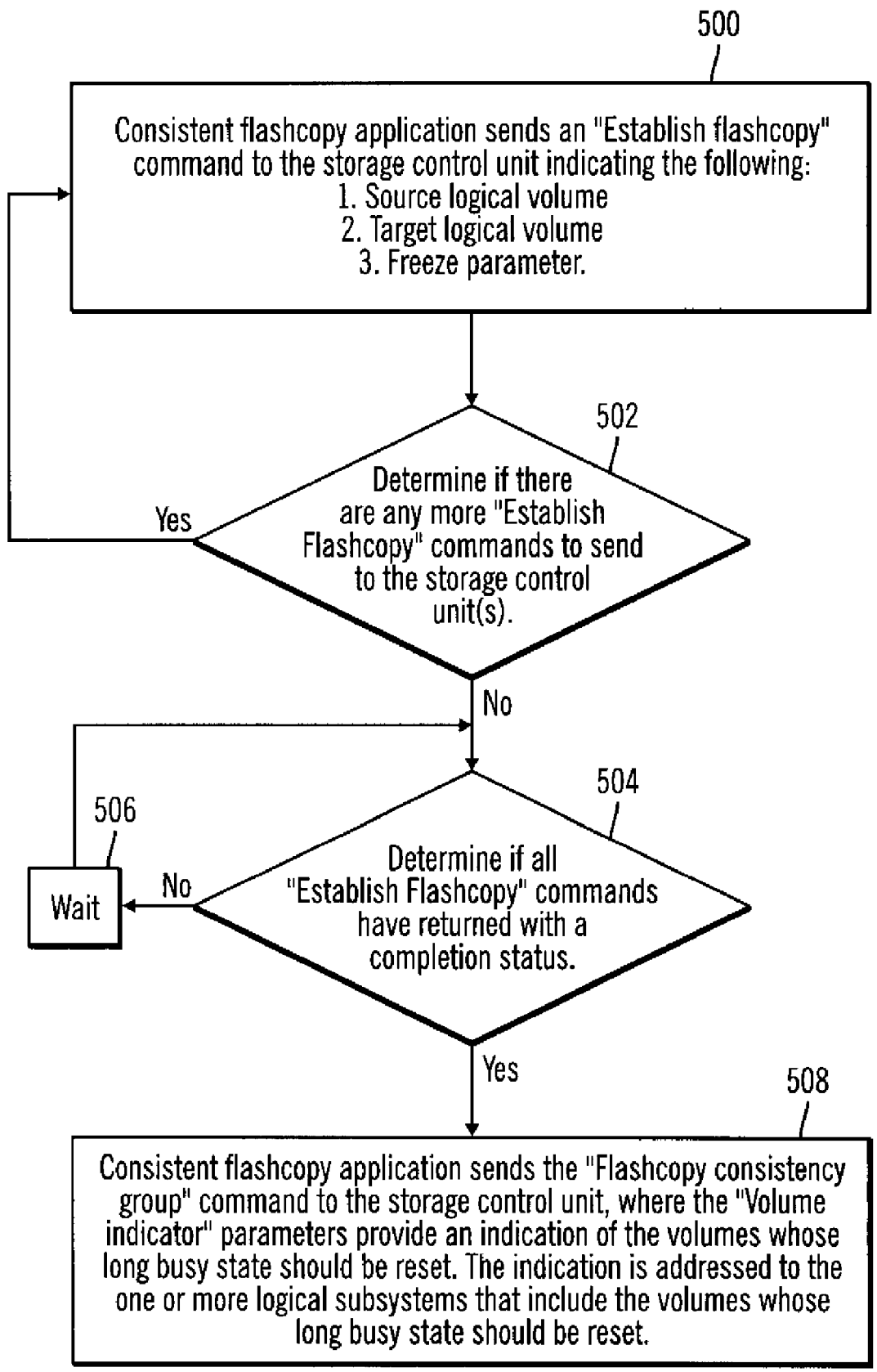
FIG. 5 illustrates logic for the consistent flashcopy application, in accordance with certain described implementations of the invention.

FIG. 5 illustrates logic implemented in the consistent flashcopy application 114, in accordance with certain implementations of the invention. The logic of FIG. 5 is for flashcopying source logical volumes to target logical volumes while maintaining consistency of logical volumes.

Control starts at block 500, where the consistent flashcopy application 114 sends an "Establish flashcopy" command 300 to the storage control unit 102 indicating the source logical volume via the source volume parameter 304, the target logical volume via the target volume parameter, and assigns the freeze parameter 308 to true if the source logical volume is to be included in a consistency group of logical volumes, i.e., the data in the logical volumes are consistent at a point in time within the consistency group. If the freeze parameter 308 is true then the source logical volume may be set to a long busy state and an application cannot write to the logical volume until the logical volume is reset from the long busy state.

The consistent flashcopy application 114 determines (at block 502) if there are any more "Establish flashcopy" commands to send to the storage control unit 102. If so, another "Establish flashcopy" command is sent (at block 500). In alternative implementations, a plurality of "Established flashcopy" commands may be processed in parallel in a plurality of storage control units.

If the consistent flashcopy application 114 determines (at block 502) that there are no further "Establish flashcopy" commands to send, then the consistent flashcopy application 114 determines (at block 504) if all the "Establish Flashcopy" commands that have been sent have returned with a completion status. If not, the consistent flashcopy application 114 waits (at block 506) and then determines (at block 502) again if all the "Establish flashcopy" commands have returned with a completion status.

If the consistent flashcopy application 114 determines (at block 504) that all "Establish flashcopy" commands have returned with a completion status, then the consistent flashcopy application 114 sends the "Flashcopy consistency group" command 302 to the storage control unit 102, where the "Group indicator" parameters 310 provide an indication of the volumes whose long busy state should be reset. The indication is addressed to the one or more logical subsystems 106a ... 106n that include the volumes whose long busy state should be reset.

Therefore, the logic of FIG. 5 illustrates how the consistent flashcopy application 114 first performs flashcopies of a plurality of logical volumes that are to be maintained in a consistent state and while performing flashcopies the consistent flashcopy application 114 sets the plurality of logical volumes to a long busy state. Subsequently, the consistent flashcopy application 114 resets the long busy state of the logical volumes when all flashcopy establish operations on the logical volumes are completed. Therefore, the consistent flashcopy application 114 performs flashcopy operations on a group of logical volumes while maintaining the group of logical volumes in a consistent state.

Figure 6:
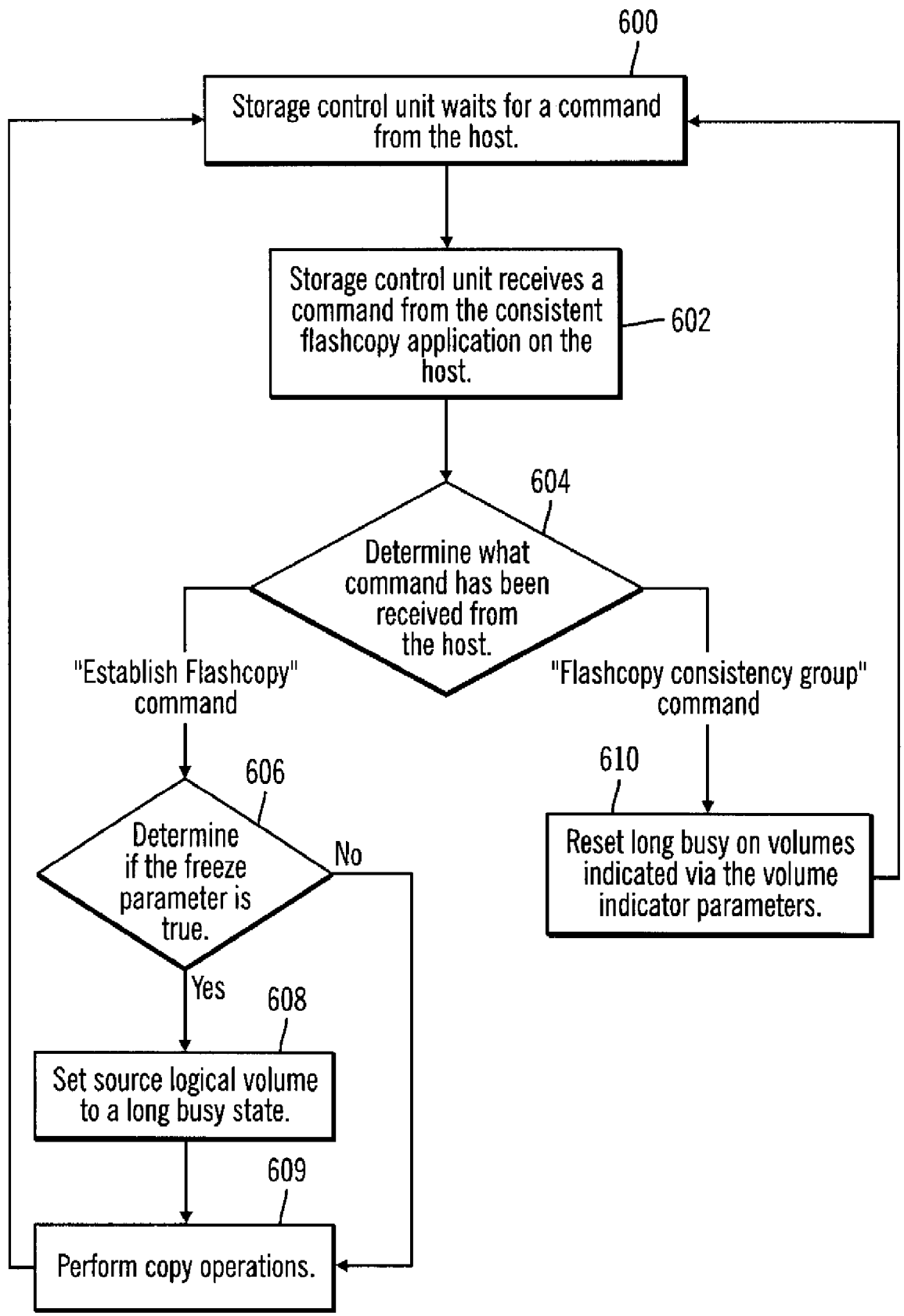
FIG. 6 illustrates logic for setting and resetting of long busy states of logical volumes in the storage control unit, in accordance with certain described implementations of the invention.

FIG. 6 illustrates logic for setting and resetting of long busy states of logical volumes in the storage control unit 102, in accordance with certain implementations of the invention. The consistent flashcopy application 114 causes the logic to be performed in the storage control unit 102.

The logic starts at block 600 where the storage control unit 102 waits for a command from the host 100 that is coupled to the storage control unit 102. The storage control unit receives (at block 602) a command from the consistent flashcopy application 114 on the host, and determines (at block 604) what command has been received from the host 100. If the received command is the "Establish flashcopy" command 300, then the storage control unit 102 determines (at block 606) whether the freeze parameter 308 is true. If so, the storage control unit 102 under the control of the consistent flashcopy application 114 sets (at block 608) the source logical volume indicated in the source volume parameter 304 of the "Establish flashcopy" command 300 to a long busy state and the storage control unit 102 performs (at block 609) copy operations, where the source logical volumes that are in a long busy state cannot be written to, and then the storage control unit 102 waits (at block 600) for the next command. If the storage control unit 102 determines (at block 606) that the freeze parameter 308 is not true, then the storage control unit 102 performs (at block 609) copy operations, and then the storage control unit 102 waits (at block 600) for the next command.

If the storage control unit determines (at block 604) that a "Flashcopy consistency group" command 302 has been received from the host 100, then the storage control unit 102 under the control of the consistent flashcopy application 114 resets (at block 610) the long busy state of logical volumes indicated by the group indicator parameters 310 of the "Flashcopy consistency group" command 302. The storage control unit 102 waits (at block 600) for the next command from the host 100.

The logic of FIG. 6 sets logical volumes in the storage control unit 102 to a long busy state, i.e., no writes can be performed on the logical volumes for an extended period of time, under the control of the consistent flashcopy application 114. The long busy state on the logical volumes is released via a "Flashcopy consistency group" command 302. Therefore, the storage control unit 102 under the control of the consistent flashcopy application 114 maintains a group of logical volumes in a consistent state while performing flashcopy operations on the group of logical volumes.

While quiescing, i.e., suspending the operation, of the write application 116 before performing flashcopy operations may ensure consistency of logical volumes being flashcopied, the implementations of the invention remove the requirement of requiring the write application 116 to be quiesced before performing flashcopy operations. In the implementations, when a volume receives a flashcopy command, the volume enters a long busy state at the beginning of the "Establish flashcopy" command 300 and does not release the long busy state until the volume receives an additional host command that releases the long busy state on the volume.

To provide a non-limiting example, a first flashcopy command copies volume A1 to B1 and a second flashcopy command copies volume A2 to B2. It is required that volumes B1 and B2 should represent a consistent state of the dataset in volumes A1 and A2. In a certain sequence of operations on the volumes the following set of dependent write operations may occur (the second operation is performed after the first operation):

1. Write to dataset on volume A1 (data updated)
2. Write to dataset on volume A2 (data updated)

When volumes A1, A2 are flashcopied to volumes B1, B2 respectively then the following non-limiting example of a sequence of operations in implementations of the invention create a consistent state in volumes B1, B2.

1. Flashcopy volume A1 to volume B1 (Volume A1 is set to the long busy state)
2. Write to dataset on volume A1 cannot occur because volume A1 is in the long busy state
3. Write to dataset on volume A2 cannot occur because the write is dependent upon the update to volume A1 completing
4. Flashcopy volume A2 to volume B2
5. Release long busy states on A1, A2
6. Write to dataset on volume A1 proceeds
7. Write to dataset on volume A2 proceeds Now, neither volume B1 nor volume B2 have the updated data, so the set of volumes B1 and B2 are consistent. In the example provided in the section "Inconsistent data in volumes after flashcopy operations," volume B2 had contained the data update of volume A2 whereas volume B1 did not contain the data update of volume A1 and the set of volumes B1, B2 were in an inconsistent state.

The implementations copy a set of source volumes to a set of target volumes, while maintaining the data on the set of source volumes and target volumes in a consistent state with respect to each other. Maintaining source and target volumes in a consistent state ensures that no out of order dependent writes are copied to any target volumes in a consistency group.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 7:
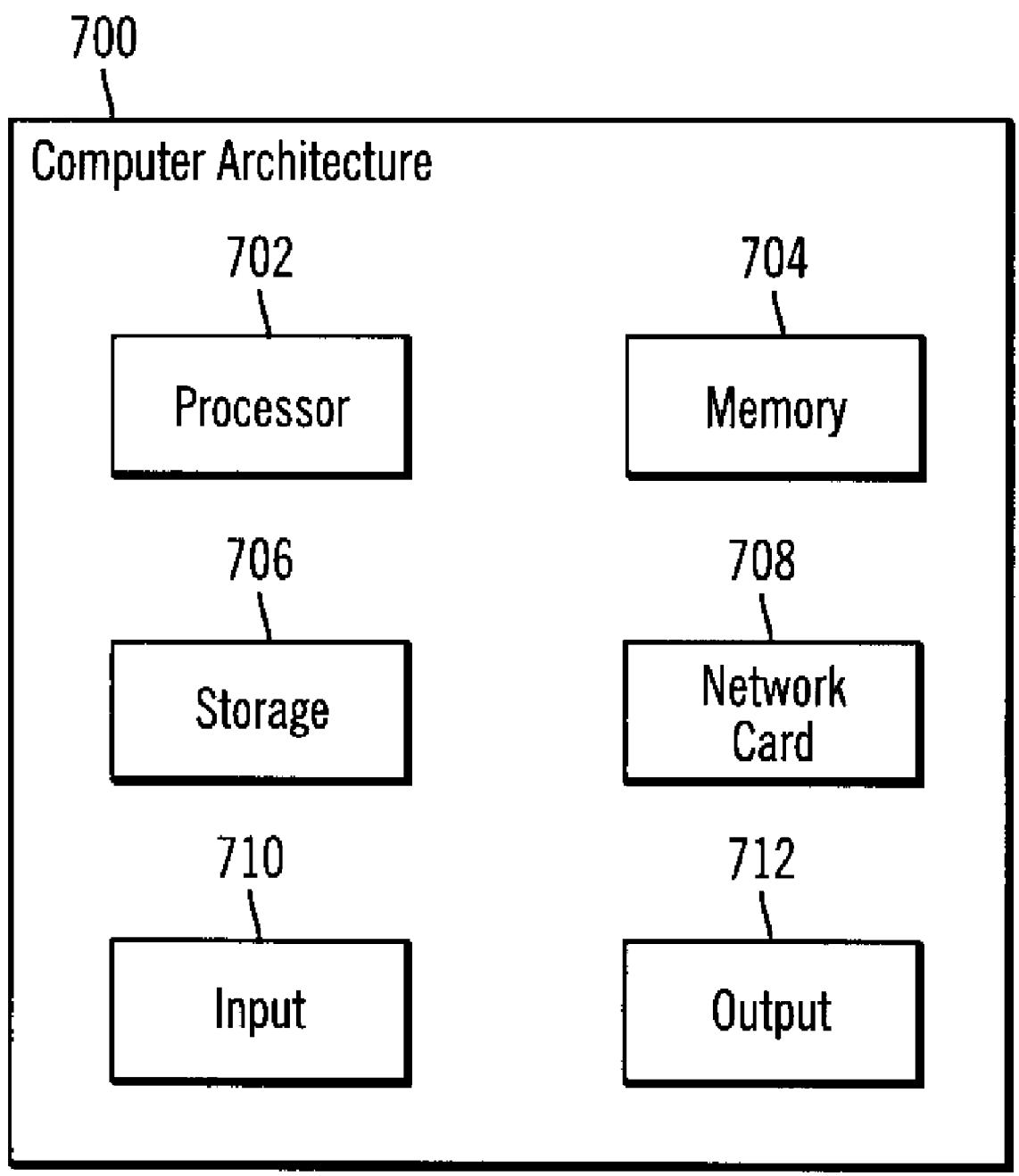
FIG. 7 illustrates a block diagram of a computer architecture in which certain described aspects of the invention are implemented.

FIG. 7 illustrates a block diagram of a computer architecture in which certain aspects of the invention are implemented. FIG. 7 illustrates one implementation of the host 100. The host 100 may implement a computer architecture 700 having a processor 702, a memory 704 (e.g., a volatile memory device), and storage 706 (e.g., a non-volatile storage, magnetic disk drives, optical disk drives, tape drives, etc.). The storage 706 may comprise an internal storage device, an attached storage device or a network accessible storage device. Programs in the storage 706 may be loaded into the memory 704 and executed by the processor 702 in a manner known in the art. The architecture may further include a network card 708 to enable communication with a network. The architecture may also include at least one input 710, such as a keyboard, a touchscreen, a pen, voice-activated input, etc., and at least one output 712, such as a display device, a speaker, a printer, etc.

The logic of FIGS. 4, 5, and 6 describe specific operations occurring in a particular order. Further, the operations may be performed in parallel as well as sequentially. In alternative implementations, certain of the logic operations may be performed in a different order, modified or removed and still implement implementations of the present invention. Moreover, steps may be added to the above described logic and still conform to the implementations. Yet further steps may be performed by a single process or distributed processes. Furthermore, while the implementations have been described with storage volumes, alternative implementations may use any storage unit known in the art.

Many of the software and hardware components have been described in separate modules for purposes of illustration. Such components may be integrated into a fewer number of components or divided into a larger number of components. Additionally, certain operations described as performed by a specific component may be performed by other components.

Certain groups of elements shown in the figures have been labeled with reference numerals having an identical numeric prefix followed by the suffix "a", the suffix "b", or the suffix "n", etc. For example, the logical subsystems are labeled 106a, 106b, ... 106n and certain logical volumes are labeled 108a, 108b, ... 108m. Labeling groups of elements in such a manner does not imply that different groups of elements contain an identical number of elements in each group. For example, the number of logical volumes in each logical subsystem 106a ... 106n may be different.

Although the implementations have been described with respect to flashcopy methods, alternative implementations of the inventions may use any other point-in-time copying techniques known in the art.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method, comprising:
    performing copy operations on source storage units to copy to target storage units, wherein the source storage units and the target storage units are coupled to a storage control unit, wherein the copy operations create a consistent copy of the source storage units in the target storage units; and
    while performing a copy operation to copy from one source storage unit to one target storage unit, restricting a write operation from being performed on the one source storage unit, until the copy operations have been performed on the source storage units, and wherein the method further comprises:
        (i) sending an establish copy command to the storage control unit;
        (ii) determining if there are additional establish copy commands to be sent to the storage control unit; and
        (iii) sending a copy consistency group command to the storage control unit, in response to determining that there are no additional establish copy commands to be sent to the storage control unit.

2. The method of claim 1, wherein the copy consistency group command removes restrictions on write operations on all the source storage units whose data are to be maintained consistent.

3. The method of claim 2, wherein the source storage units and the target storage units are logical volumes coupled to the storage control unit, wherein the logical volumes are distributed among a plurality of logical subsystems coupled to the storage control unit, the method further comprising:
    addressing a first source storage unit via a first logical subsystem that includes the first source storage unit, to perform a first copy operation of the first source storage unit.

4. The method of claim 3, wherein the source and target logical volumes are coupled to a single storage control unit, wherein performing copy operations and restricting the write operation are performed by a host coupled to the single storage control unit.

5. The method of claim 2, further comprising:
    receiving a first write operation for a first storage unit;
    determining if the first storage unit is in a state where write operations are restricted;
    if the first storage unit is in a state where write operations are restricted, then queuing the first write operation; and
    if the first storage unit is in a state where write operations are not restricted, then performing the first write operation on the first storage unit.

6. The method of claim 2, wherein the storage control unit is coupled to a host, wherein an application implemented in the host controls the storage control unit, the method further comprising:
    receiving a command at the storage control unit from the application;
    determining the received command; and if the received command is the establish copy command for the one source storage unit, wherein data in the one source storage unit are to be maintained consistent, then setting the one source storage unit to a first state, wherein in the first state write operations are restricted on the one source storage unit.

* * * * *